United States Patent [19]
Nakamura

[11] Patent Number: 5,632,699
[45] Date of Patent: May 27, 1997

[54] BICYCLE CHAINWHEEL

[75] Inventor: Yasushi Nakamura, Sakai, Japan

[73] Assignee: Shimano, Inc., Osaka, Japan

[21] Appl. No.: 521,362

[22] Filed: Aug. 31, 1995

[30] Foreign Application Priority Data

Sep. 9, 1994 [JP] Japan .................... 6-215989

[51] Int. Cl.$^6$ ........................ B62M 9/12
[52] U.S. Cl. ........................ 474/160
[58] Field of Search ................ 474/160, 158, 474/152, 153, 155, 156

[56] References Cited

U.S. PATENT DOCUMENTS

| | | | |
|---|---|---|---|
| 4,889,521 | 12/1989 | Nagano | 474/164 |
| 5,073,151 | 12/1991 | Nagano | 474/160 |
| 5,458,543 | 10/1995 | Kobayashi | 474/160 |

FOREIGN PATENT DOCUMENTS

| | | | |
|---|---|---|---|
| 0 474 139 A1 | 3/1992 | European Pat. Off. | B62M 9/10 |
| 0 479 032 A1 | 4/1992 | European Pat. Off. | B62M 9/10 |
| 0 510 361 A1 | 10/1992 | European Pat. Off. | B62M 9/10 |

*Primary Examiner*—Roger J. Schoeppel
*Attorney, Agent, or Firm*—James A. Deland

[57] ABSTRACT

A bicycle chainwheel has a plurality of first teeth spaced at (p-α) from each other, where p is the chain pitch, and a second tooth shaped differently from at least one of the first teeth. A sum of the pitch P between one of the first teeth disposed immediately ahead of the second tooth in a driving direction of the chainwheel and another one of the first teeth disposed behind the second tooth is greater than 2(p-α). If desired, P may be approximately equal to 2(p-α)+α. In the case where there is a plurality N of the second teeth disposed adjacent to each other, where N is an integer greater than one, then P is preferably greater than (p-α)×(N+1), and, if desired, approximately equal to ((p-α)×(N+1))+Nα. In the case of a chainwheel having missing teeth, then a sum of the pitch P between a first one of the plurality of teeth and a second one of the plurality of teeth disposed adjacent thereto is preferably greater than (p-α)×(N+1), where N is an integer greater than zero.

18 Claims, 4 Drawing Sheets

BICYCLE CHAINWHEEL

BACKGROUND OF THE INVENTION

The present invention is directed to bicycle chainwheels and, more particularly, to a bicycle chainwheel of the type having missing teeth or teeth shaped differently from other teeth on the chainwheel.

FIG. 7 is a view from the bottom of part of a known rear multi-gear chainwheel mounted on the rear hub of a bicycle. The drive face of two of the ordinary teeth 4 is removed to produce smooth-disengagement teeth 5 in which the tooth width d thereof is smaller than the tooth width D of the ordinary teeth 4.

In general, the pitch between the ordinary teeth 4 is set to $p-\alpha$ (where p is the pitch of the chain 3 hooked onto the chainwheel 1'), which is somewhat smaller than the chain pitch p so that the engagement with the chain 3 will be smoother. Furthermore, the sum of the pitches P between the ordinary tooth 4 immediately ahead of the smooth-disengagement teeth 5 and the ordinary tooth 4 immediately behind is set to be the sum of the pitches $p-\alpha$ between the ordinary teeth 4, i.e., $(p-\alpha) \times 3$.

Similarly, although not depicted in the figures, there are also chainwheels in which some of the numerous teeth of the chainwheel were removed to facilitate shifting, or in which some of the teeth are bent into chain guard stays. In these chainwheels the sum of the pitches P between the ordinary teeth immediately ahead of and behind the removed or bent teeth is also set to be $(p-\alpha) \times (N+1)$. In this case N is the number of continuous removed teeth or the number of continuous bent teeth.

In a chainwheel composed solely of ordinary teeth 4 (i.e., no smooth-disengagement teeth 5 are provided and none of the teeth are bent), the drive force is transmitted when the roller 3a of the chain 3 comes into contact with the drive face of the forwardmost ordinary tooth 4 in the drive direction. When the chain 3 is disengaged from this forwardmost ordinary tooth 4, the next roller 3a of the chain 3 comes into contact with the next ordinary tooth 4, but there is a gap of $\alpha$, which is the difference between the chain pitch p and the tooth pitch $p-\alpha$, between the drive face of the next ordinary tooth 4 and the next roller 3a. Consequently, the chain 3 or the chainwheel moves forward relatively by this distance $\alpha$, after which the drive face of the next ordinary tooth 4 and the next roller 3a come into contact. This occurs with each tooth, so the presence of the gap $\alpha$ generates a sound referred to as clicking.

In the above chainwheel 1' having the smooth-disengagement teeth 5, the smooth-disengagement teeth 5 produced by removal of the drive face do not participate in the transmission of drive force as much as do the ordinary teeth 4, and those teeth that are completely removed or bent do not play any part in the transmission of drive force. Nevertheless, the chainwheels are still constructed with the gap of $\alpha$ for each tooth as noted above. Thus, when an $\alpha$ equal to the number of smooth-disengagement teeth 5 is added and there are two continuous smooth-disengagement teeth 5 (for example), then a gap of $3\alpha$ will be present between the roller 3a and the ordinary tooth 4 immediately behind the smooth-disengagement teeth 5. The sudden motion of the chain or chainwheel as it moves across this relatively large gap, in contrast to a gap of $\alpha$ in the normal case, interferes with smooth pedaling and causes a very unpleasant noise. The same holds true for chainwheels having completely removed or bent teeth.

SUMMARY OF THE INVENTION

The present invention is directed to a bicycle chainwheel of the type having missing teeth or teeth shaped differently from other teeth on the chainwheel and which substantially reduces or eliminates unpleasant noises and rough operation. In one embodiment of the present invention, a bicycle chainwheel has a plurality of first teeth spaced at $(p-\alpha)$ from each other, where p is the chain pitch, and a second tooth shaped differently from at least one of the first teeth. A sum of the pitch P between one of the first teeth disposed immediately ahead of the second tooth in a driving direction of the chainwheel and another one of the first teeth disposed behind the second tooth is greater than $2(p-\alpha)$. If desired, P may be approximately equal to $2(p-\alpha)+\alpha$. In the case where there is a plurality N of the second teeth disposed adjacent to each other, where N is an integer greater than one, then P is preferably greater than $(p-\alpha) \times (N+1)$ and, if desired, approximately equal to $((p-\alpha) \times (N1))+N\alpha$. In the case of a chainwheel having missing teeth, then a sum of the pitch P between a first one of the plurality of teeth and a second one of the plurality of teeth disposed adjacent thereto is preferably greater than $(p-\alpha) \times (N+1)$, where N is an integer greater than zero.

DETAILED DESCRIPTION OF THE EMBODIMENTS

Figure 1:
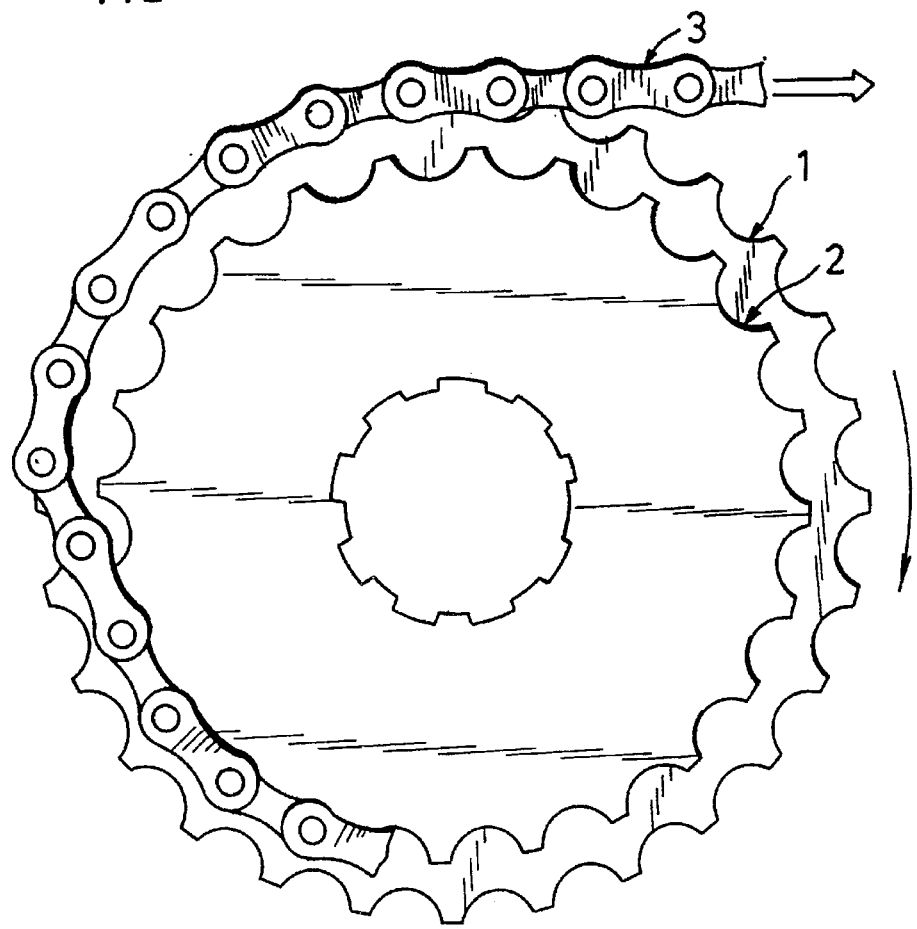
FIG. 1 is a side view of a particular embodiment of a bicycle chainwheel assembly according to the present invention.

FIG. 1 is a side view of a particular embodiment of a rear multi-gear chainwheel according to the present invention that is mounted on the rear hub of a bicycle. This chainwheel usually comprises about eight chainwheels of different diameter, but for the sake of simplicity, only two chainwheels of different diameter are shown, namely, a chainwheel 1 with an arbitrarily selected large diameter and a smaller-diameter chainwheel 2 that is adjacent to this large-diameter chainwheel. The rest of the chainwheels are not depicted. In FIG. 1, the chain 3 that had been hooked onto the large-diameter chainwheel 1 is about to be downshifted onto the small-diameter chainwheel 2 by a derailleur (not shown).

Figure 2:
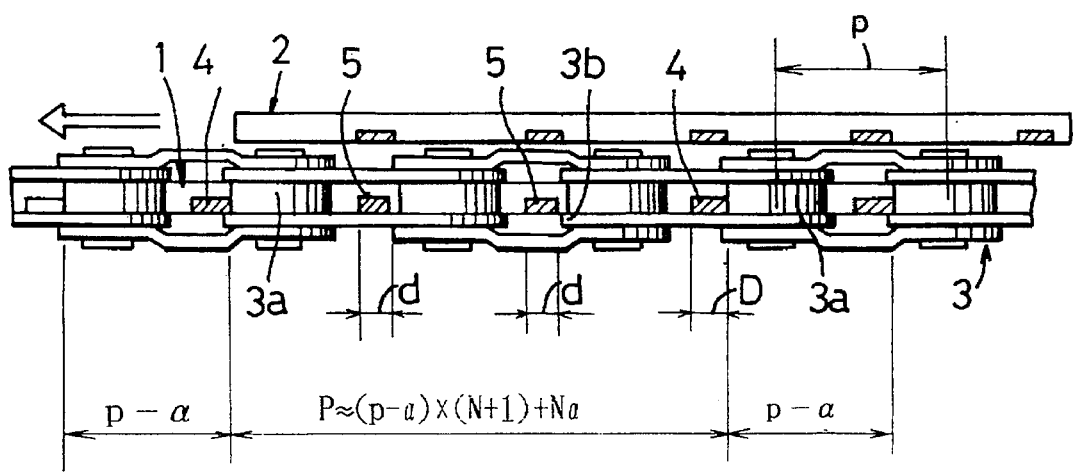
FIG. 2 is a bottom view of the chainwheel assembly shown in FIG. 1.
Figure 4:
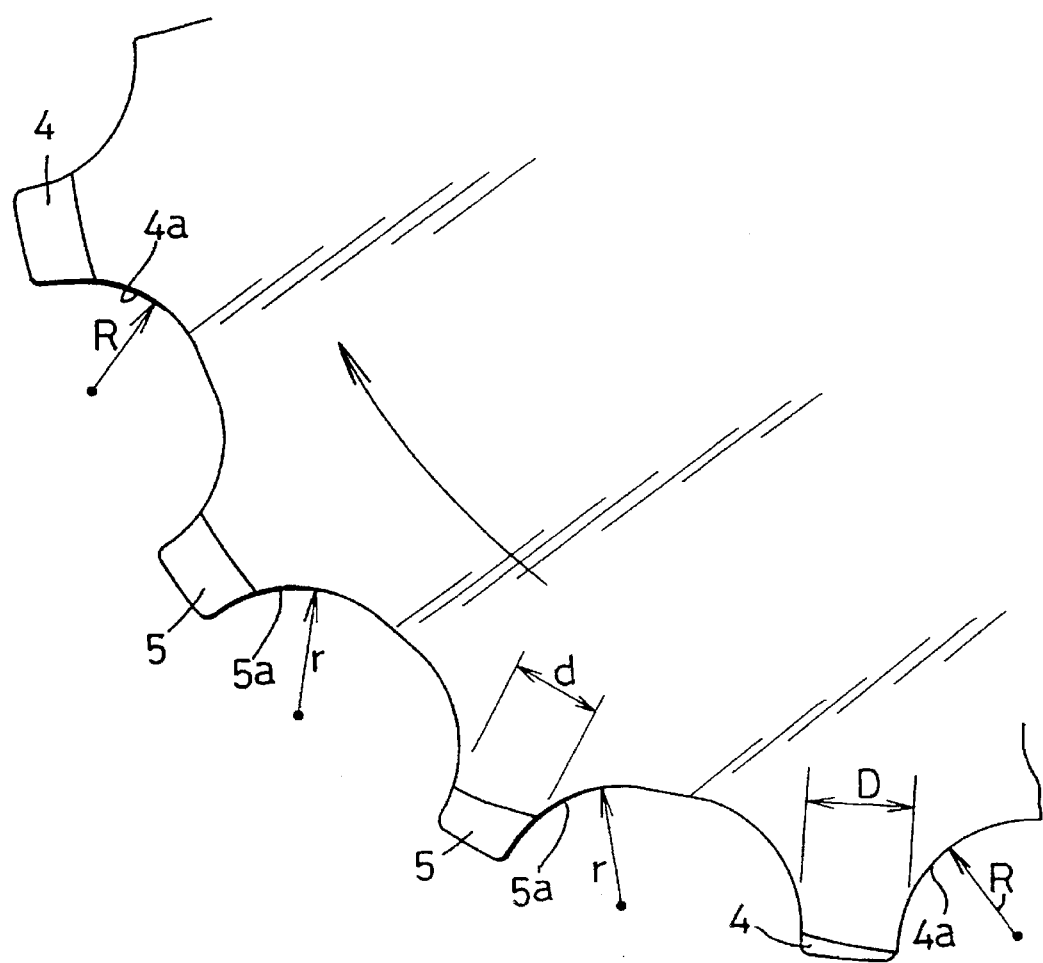
FIG. 4 is an enlarged detail side view of a particular embodiment of one of the chainwheels shown in FIG. 1.

Almost all of the numerous teeth on the above-mentioned large-diameter chainwheel 1 are ordinary teeth 4, but two specific, continuous teeth are smooth-disengagement teeth 5 from which the chain 3 is readily disengaged. More specifically, as shown in FIG. 2, the drive face 5a side of the smooth-disengagement teeth 5, which comes into contact with the roller 3a of the chain 3 during drive, has been removed somewhat, so that the tooth width d of this smooth-disengagement teeth 5 is smaller than the tooth width D of the other ordinary teeth 4. As shown in more detail in FIG. 4, the area around the bottom of the tooth of the drive face 4a of the ordinary tooth 4 forms a circular surface with a radius of R, and the area around the bottom of the drive face 5a of the smooth-disengagement teeth 5 forms a circular surface with a radius of r, which is larger than the radius R. As a result, the tooth width d of the smooth-disengagement teeth 5 is smaller than the tooth width D of the ordinary teeth 4.

Figure 3:
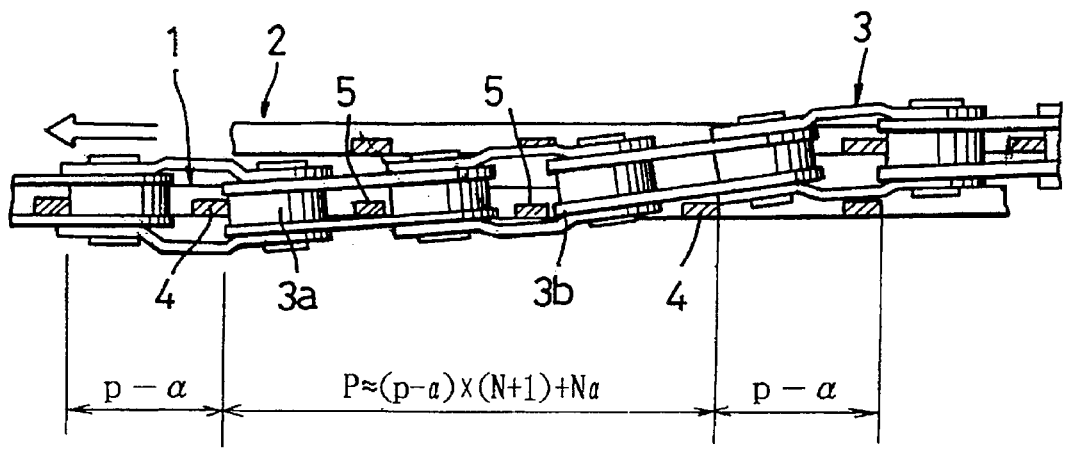
FIG. 3 is a bottom view of the chainwheel assembly shown in FIG. 1 illustrating a chain switching from one chainwheel to another chainwheel.

Since the tooth width d of the smooth-disengagement teeth 5 is smaller than the tooth width D of the ordinary teeth 4, as shown in FIG. 3, the inner link end 3b of the chain 3 does not come into contact with these smooth-disengagement teeth 5 during shifting by the derailleur (not shown). The chain 3 is inclined as desired, and this chain 3 is readily disengaged from the large-diameter chainwheel 1 and changed onto the adjacent small-diameter chainwheel 2. Thus, as to how much larger the radius of the smooth-disengagement teeth 5 should be than the radius R of the drive face 4a of the ordinary teeth 4, it should be large enough that the inner link end 3b of the chain 3 does not come into contact with the smooth-disengagement teeth 5 during shifting.

The pitch between the above-mentioned ordinary teeth 4 is set at (p-α), where p is the pitch of the chain 3 so that engagement of the chain with the chainwheel will be smooth. Then, if we let the sum of the pitches between the ordinary tooth 4 immediately ahead of the two smooth-disengagement teeth 5 and the ordinary tooth 4 immediately behind be P, then the formula with a conventional chainwheel would be $$P=(p-\alpha)\times 3,$$

and if we let the number of continuous smooth-disengagement teeth 5 be N, then the formula would be $$P=(p-\alpha)\times(N+1)$$

With the chainwheel of the present invention, however, the sum is set such that it will satisfy the following formula:

$$P>(p-\alpha)\times(N+1)$$

and more specifically, such that it will satisfy the following formula:

$$P=(p\alpha)\times(N+1)+N\alpha$$

Figure 5:
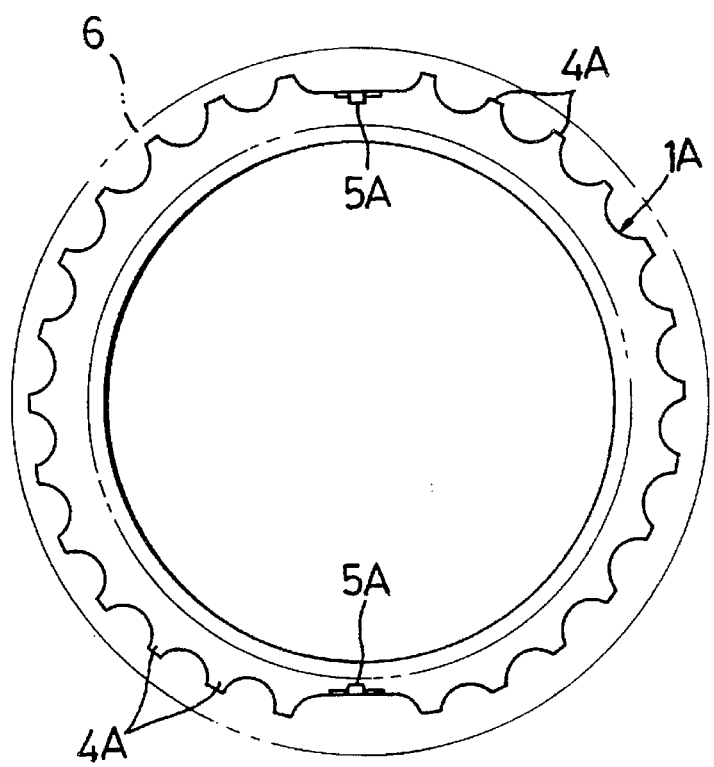
FIG. 5 is a side view of an alternative embodiment of a bicycle chainwheel assembly according to the present invention.
Figure 6:
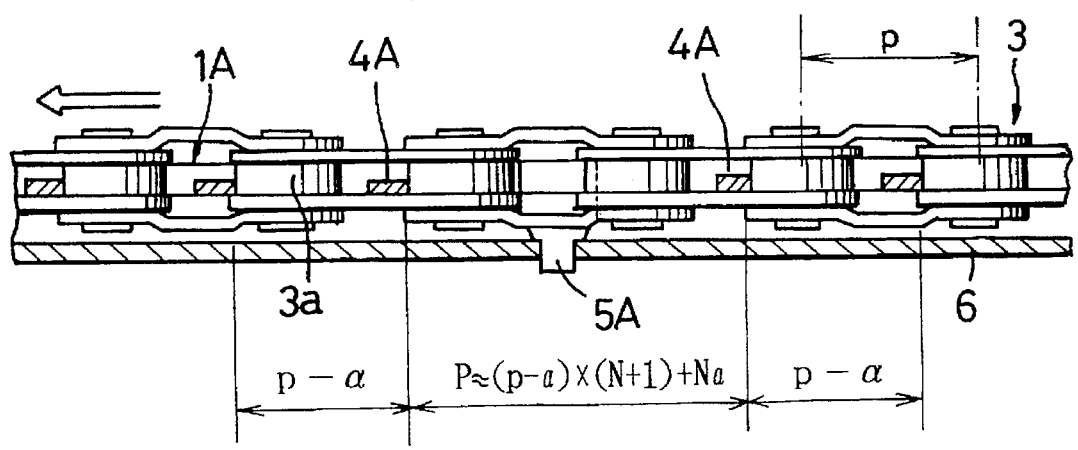
FIG. 6 is a plan view of the chainwheel assembly shown in FIG. 5.
Figure 7:
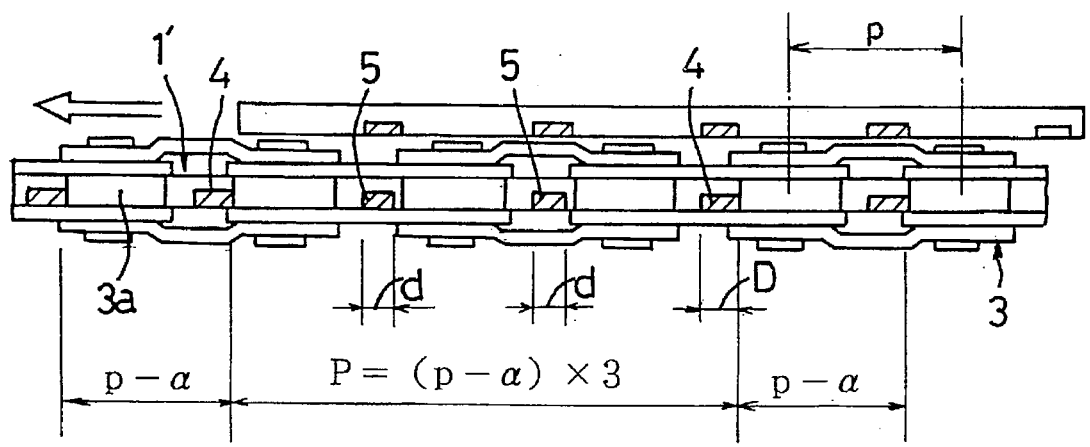
FIG. 7 is a bottom view of a known chainwheel assembly.

Therefore, although in the past there was a gap of (N+1)α which had to be taken up when the chain switched from the drive face 4a of the ordinary tooth 4 immediately ahead of the smooth-disengagement teeth 5 to the ordinary tooth 4 immediately behind the smooth-disengagement teeth, there is only a gap of α with the present invention. Since this gap of α is the same value as the gap occurring with all the other ordinary teeth 4, there is no unpleasant noise, and pedaling is also smoother. FIGS. 5 and 6 show an alternative embodiment of the present invention. This embodiment usually comprises two or three chainwheels of different diameter, but for the sake of simplicity, only chainwheel 1A with the largest diameter is shown, and the rest of the chainwheels are omitted.

Almost all of the numerous teeth on this largest-diameter chainwheel 1A are ordinary teeth 4A, but two specific teeth are bent 180° to the outside, and a chain guard 6 is fixed to these bent teeth. In other words, components that were originally intended to act as teeth instead act as stays for the chain guard 6, and as a result non-working tooth portions 5A that do not act as teeth are formed.

As shown in FIG. 6, if we let the pitch of the chain 3 be p, the pitch between the ordinary teeth 4A be (p-α), and the sum of the pitches between the ordinary tooth 4A immediately ahead of the non-working tooth portion 5A and the ordinary tooth 4A immediately behind be P, then the formula with a conventional chainwheel would be $$P=(p-\alpha)\times(N+1)$$

but with the chainwheel of the present invention, the formula is $$P>(p-\alpha)\times(N+1)$$

and more specifically, the formula is $$P=(p\alpha)\times(N+1)+N\alpha$$

With this construction, as in the first embodiment, smooth pedaling can be achieved without the generation of unpleasant noise.

While the above is a description of some embodiments of the present invention, even further modifications may be employed. For example, in the first embodiment a rear multi-gear chainwheel was used as an example, but the same technology can be applied to a front multi-gear chainwheel as well. Also, downshifting, in which the chain 3 was changed from the large-diameter chainwheel 1 onto the small-diameter chainwheel 2, was used as an example, but it is also possible conversely to change the chain 3 from the small-diameter chainwheel 2 onto the large-diameter chainwheel 1. The smooth-disengagement teeth 5 can be provided on the smaller diameter chainwheel, if desired.

The example given in the second embodiment involved bending specific teeth to the outside and utilizing them as stays for the chain guard 6, thereby forming non-working tooth portions 5A that do not function as teeth. Alternatively, this technology can also be applied to a chainwheel in which some of the teeth are removed in order to enhance sitability, and these removed portions are used as the non-working tooth portions 5A.

As noted above, the pitch (p-α) between the ordinary teeth 4 or 4A was based on the drive face of the ordinary teeth 4 or 4A, and the sum P of the pitches between the ordinary tooth 4 immediately ahead of the smooth-disengagement teeth 5 and the ordinary tooth 4 immediately behind, as well as the sum P of the pitches between the ordinary tooth 4A immediately ahead of the non-working tooth portion 5A and the ordinary tooth 4A immediately behind, were based on the drive face of the ordinary teeth 4 or 4A. Of course, the determination of these pitches does not necessarily have to be based on the drive face, and can instead be based on the center of the tooth bottom or the center of the tooth crown, or can be based on the center of the circular surface formed by the area around the tooth bottom of the drive face of the ordinary teeth 4 or 4A. These are just some of the various application versions that are possible, and many more are possible. Consequently, the scope of the invention should not be limited to the specific examples shown. Instead, the scope of the invention should be determined by the following claims.

What is claimed is:

1. A bicycle chainwheel having a plurality of teeth spaced at (p-α) from each other, where p is the chain pitch and α is a real number greater than zero and less than p, and a sum of the pitch P between a first one of the plurality of teeth and a second one of the plurality of teeth disposed adjacent thereto on the same chainwheel is greater than $(p-\alpha) \times (N+1)$, where N is an integer greater than zero.

2. The chainwheel according to claim 1 wherein P is approximately equal to $((p-\alpha) \times (N+1)) + N\alpha$.

3. A bicycle chainwheel having a plurality of first teeth spaced at $(p-\alpha)$ from each other, where p is the chain pitch and a is a real number greater than zero and less than p, and a second tooth shaped differently from at least one of the first teeth, wherein a sum of the pitch P between one of the first teeth disposed immediately ahead of the second tooth on the same chainwheel in a driving direction of the chainwheel and another one of the first teeth disposed behind the second tooth on the same chainwheel is greater than $2(p-\alpha)$.

4. The chainwheel according to claim 3 wherein P is approximately equal to $2(p-\alpha) + \alpha$.

5. The chainwheel according to claim 3 wherein the second tooth is bent to form a non-working tooth.

6. The chainwheel according to claim 3 wherein a width of the second tooth is less than a width of the first tooth.

7. The chainwheel according to claim 3 wherein there is a plurality N of the second teeth disposed adjacent to each other, where N is an integer greater than one, and wherein P is greater than $(p-\alpha) \times (N+1)$.

8. The chainwheel according to claim 7 wherein P is approximately equal to $((p-\alpha) \times (N+1)) + N\alpha$.

9. The chainwheel according to claim 7 wherein the plurality of second teeth are bent to form non-working teeth.

10. The chainwheel according to claim 7 wherein N equals two.

11. The chainwheel according to claim 7 wherein a width of a second tooth is less than a width of a first tooth.

12. The chainwheel according to claim 7 wherein a width of each second tooth is less than a width of each first tooth.

13. A bicycle chainwheel assembly comprising a larger diameter chainwheel disposed adjacent to a smaller diameter chainwheel, at least one of the larger diameter chainwheel or the smaller diameter chainwheel having a plurality of first teeth spaced at $(p-\alpha)$ from each other, where p is the chain pitch and $\alpha$ is a real number greater than zero and less than p, and a plurality N of second teeth on the same chainwheel as the plurality of first teeth disposed adjacent to each other and shaped differently from at least one of the plurality of first teeth on the fame chainwheel, where N is an integer greater than one, and a sum of the pitch P between one of the plurality of first teeth disposed immediately ahead of the plurality of contiguously disposed second teeth on the same chainwheel in a driving direction of the chainwheel and another one of the plurality of first teeth disposed immediately behind the plurality of contiguously disposed second teeth on the same chainwheel is greater than $(p-\alpha) \times (N+1)$.

14. The chainwheel assembly according to claim 13 wherein P is approximately equal to $((p-\alpha) \times (N+1)) + N\alpha$.

15. The chainwheel assembly according to claim 13 wherein the plurality of second teeth are bent to form non-working teeth.

16. The chainwheel assembly according to claim 13 wherein N equals two.

17. The chainwheel assembly according to claim 13 wherein a width of a second tooth is less than a width of a first tooth.

18. The chainwheel assembly according to claim 13 wherein a width of each second tooth is less than a width of each first tooth.

* * * * *